Jan. 10, 1956　　　G. G. BLUEMINK　　　2,729,987
CHAIN SAW SHARPENER

Filed July 7, 1952　　　　　　　　　　　5 Sheets-Sheet 1

INVENTOR:
GARY G. BLUEMINK
BY:
ATTORNEYS:

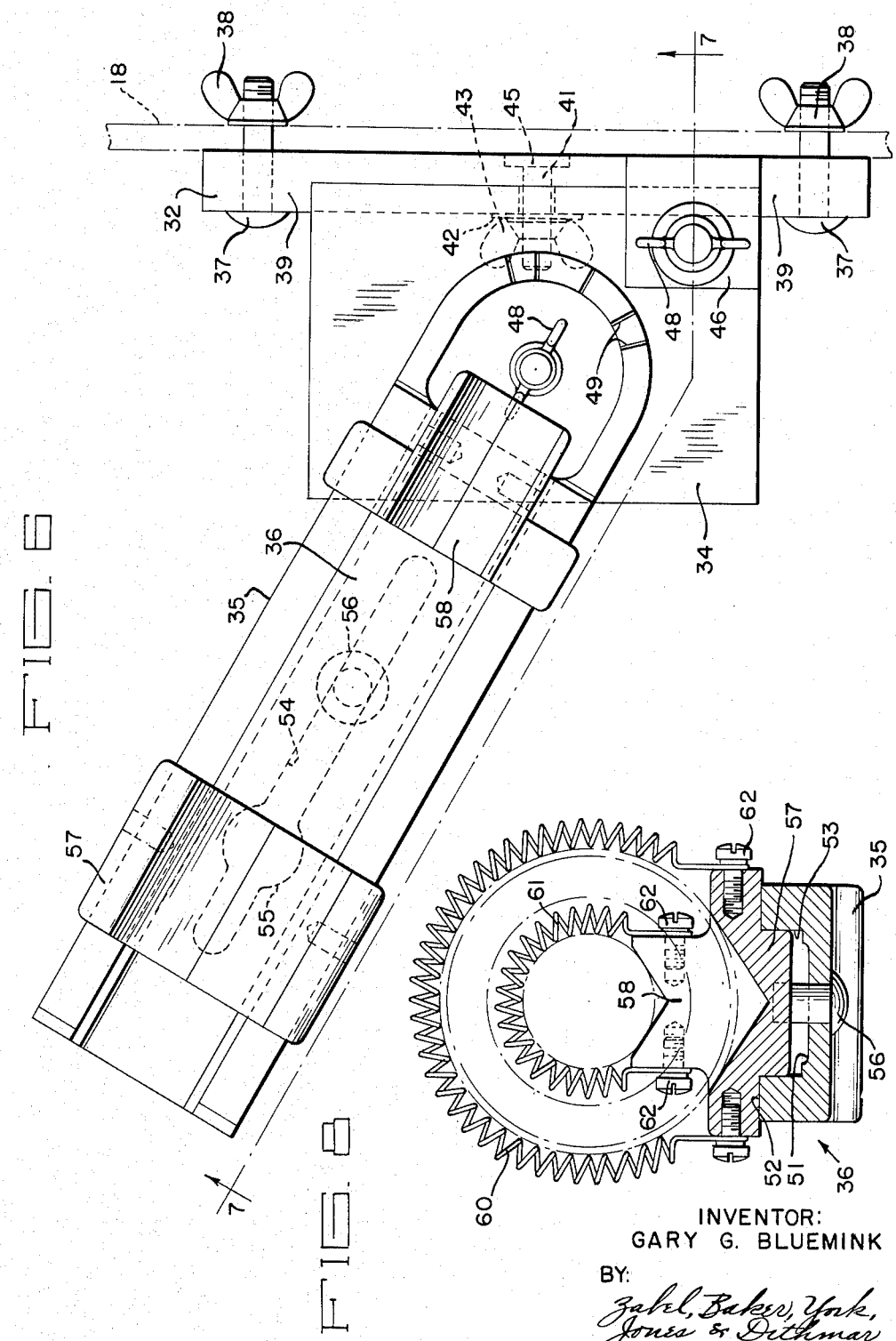

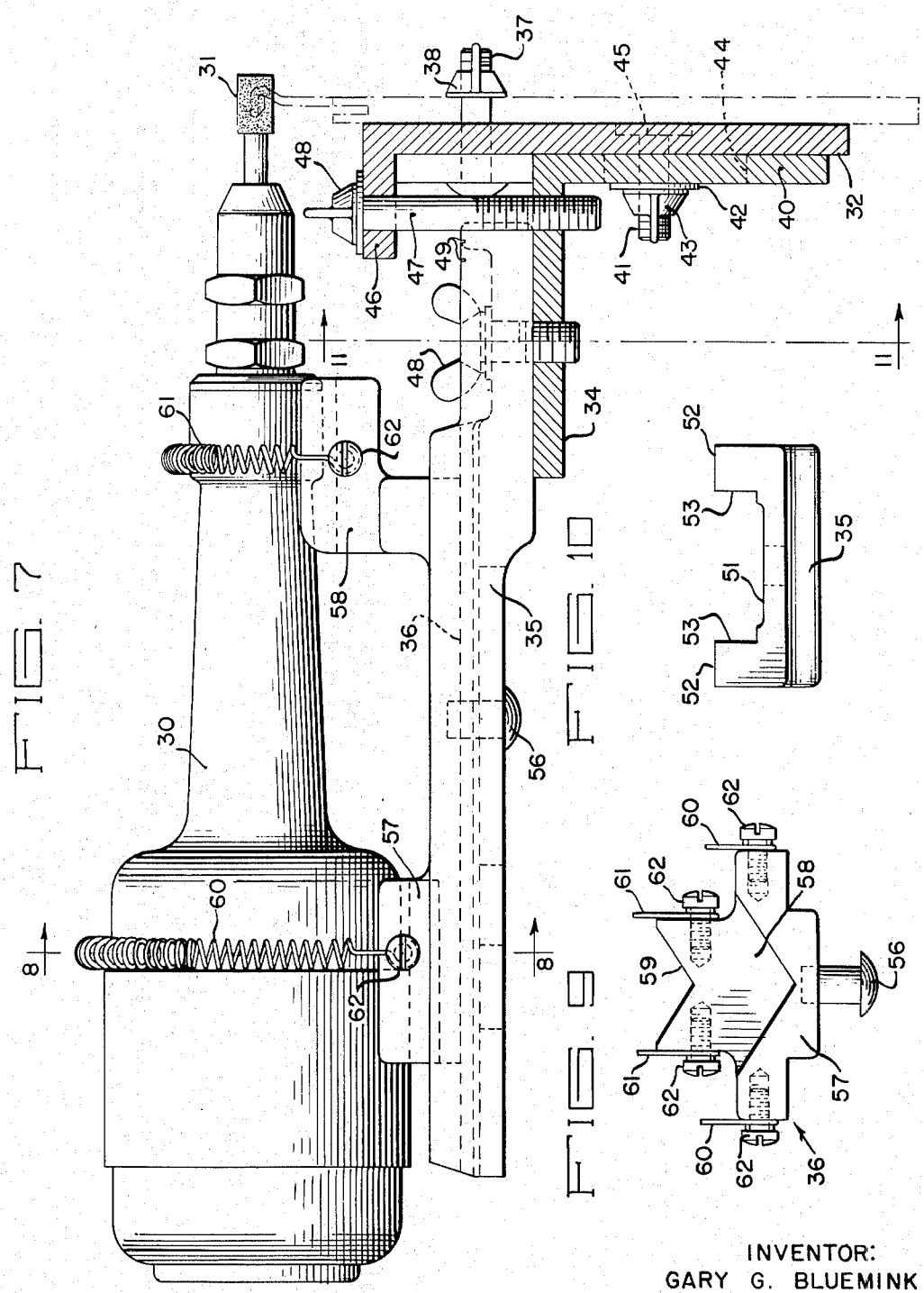

Jan. 10, 1956    G. G. BLUEMINK    2,729,987
CHAIN SAW SHARPENER

Filed July 7, 1952    5 Sheets-Sheet 4

INVENTOR:
GARY G. BLUEMINK
BY:
Zabel, Baker, York,
Jones & Dithmar
ATTORNEYS

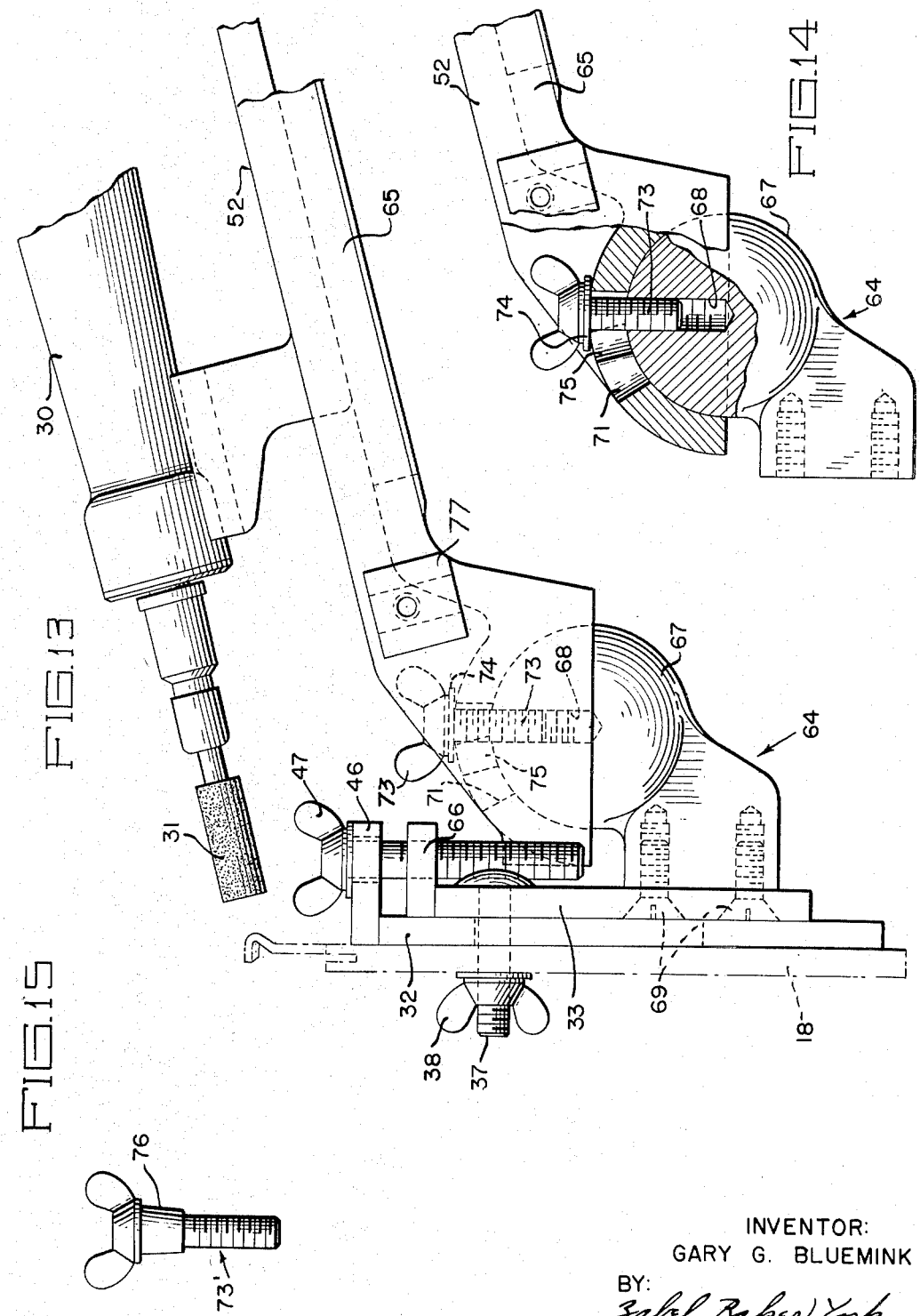

United States Patent Office 2,729,987
Patented Jan. 10, 1956

2,729,987

CHAIN SAW SHARPENER

Gary G. Bluemink, Racine, Wis., assignor to The Dumore Company, Racine, Wis., a corporation of Wisconsin Application July 7, 1952, Serial No. 297,510

7 Claims. (Cl. 76—37)

This invention relates to an improved chain saw sharpener.

In one type of chain saw, the cutter teeth are in the form of two series of routers, one series comprising left-hand routers and the other series, right-hand routers, these series being spaced from each other by a third series of links which carry a gauge tooth for each cutter tooth.

The cutter teeth can be characterized as routers for the reason that the outer end of the tooth is bent over and disposed in a plane which is perpendicular to the plane of the chain. Thus, the cutting edge of each tooth is not a straight edge.

It is an object of the present invention to provide an improved sharpener in the form of a grinder in combination with a special mounting means therefor whereby a uniform edge can be applied to all of the teeth of a given series.

Another object is to provide a sharpener for grinding a cylindrical surface on a cutter tooth and which can be oriented in a fixed angular position so that a whole series of identical such surfaces can be ground on a series of cutter teeth.

Still another object is to provide a sharpener which includes a grinder, together with means to shift the same into and out of operative position without changing its angular disposition and its axial elevation with respect to the successive teeth of a series.

A still further object is to provide in a device of this type, improved means for mounting a grinder for axial movement for grinding the cutter teeth, and for a swinging movement for grinding the gauge teeth of a chain saw.

A still further object is to provide in a device of this type convenient means for detachably mounting a grinder in a centered position and for longitudinal sliding motion on an angularly adjustable slide bracket.

Other objects, features and advantages will become apparent as the description proceeds.

With reference now to the drawings in which like reference numerals designate like parts:

Fig. 6 is a plan view of the embodiment of my invention shown in Fig. 1, with the grinder removed;

Fig. 7 is an elevation, partly in section, and taken along line 7—7 of Fig. 6;

Fig. 8 is a section taken along line 8—8 of Fig. 7; the grinder being omitted for purposes of illustration;

Fig. 9 is an end view of the horizontal slide;

Fig. 10 is an end view of the slide bracket;

Fig. 13 is a side view thereof;

Fig. 14 is a detail, partly in section, showing the ball and socket joint; and

Fig. 15 shows a modified form of clamping screw for use with the embodiment of Figs. 12–14.

Fig. 1 shows a chain saw, designated generally by the reference numeral 15, to which the chain saw sharpener 16, embodying my invention, is applied. In order to best describe the nature and operation of the chain saw sharpener it is deemed advisable to indicate briefly the pertinent features of the chain saw.

Figure 2:
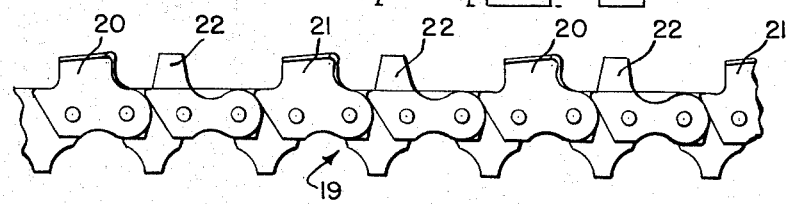
Fig. 2 is a detail showing a section of chain and illustrating three series of teeth carried thereon.

The chain saw 15 comprises a suitable driving means 17 which also provides a handle for supporting the chain saw. The saw itself comprises a blade 18 which forms a track upon which a chain 19 can slide. As shown in Fig. 2, the chain comprises a series of right-hand cutter teeth 20, a series of left-hand cutter teeth 21, and a series of gauge teeth 22. The adjacent teeth of each series are separated from each other by suitable connecting links, and the links of the gauge teeth series are disposed centrally between the links of the left-hand and right-hand cutter teeth series.

Figure 3:
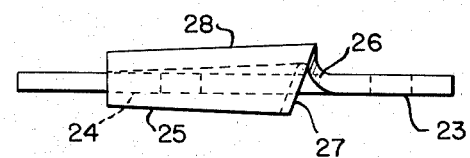
Fig. 3 is a top view of a right-hand cutter tooth.
Figure 4:
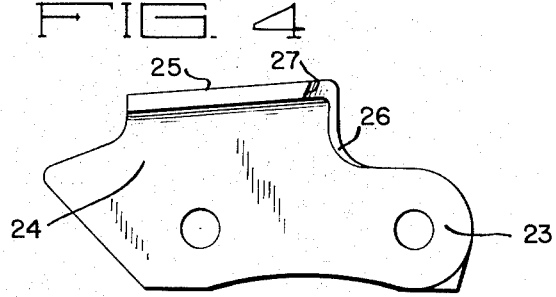
Fig. 4 is a side view of the tooth shown in Fig. 3.
Figure 5:
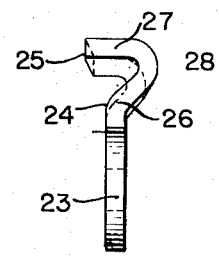
Fig. 5 is an end view thereof.
Figure 11:
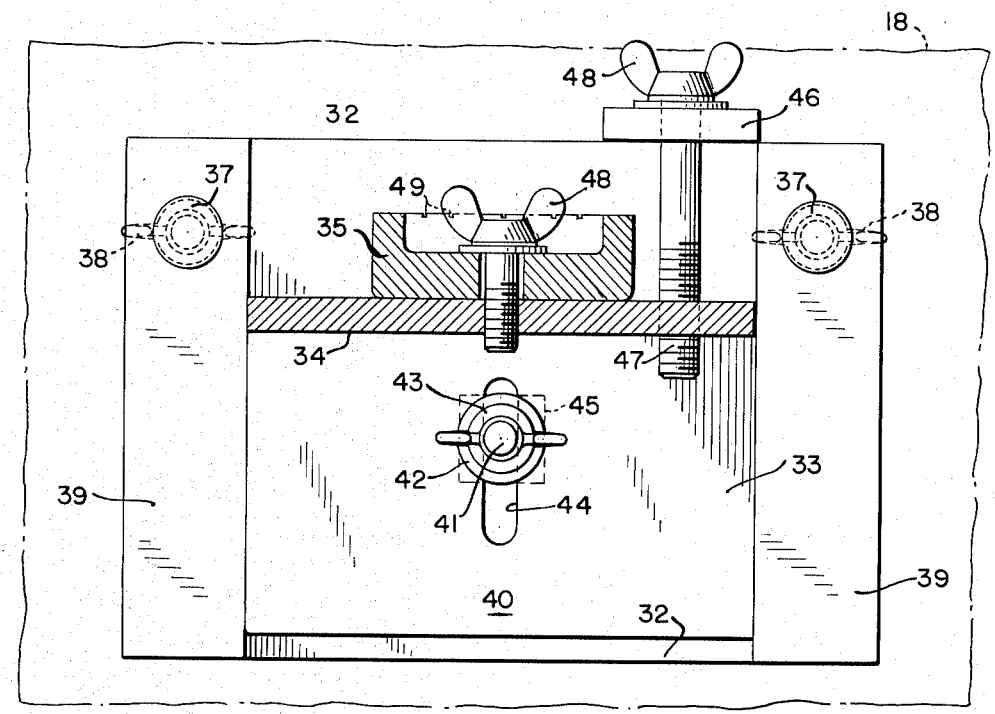
Fig. 11 is a section taken along line 11—11 of Fig. 7, showing the cooperation of the vertical slide with the mounting plate.

Figs. 3 to 5 show the configuration of a right-hand cutter tooth. The cutter tooth 20 includes a body 23, a shank 24 which is bent outwardly and disposed at an angle to the body, and a top horizontal portion 25. It will be observed that the dimensions of the tooth taper from the leading edge to the trailing edge so as to provide clearance. The tooth is ground along its leading edge so as to provide a vertically disposed cutting edge 26 and a horizontally disposed cutting edge 27, which are connected by an intermediate cutting edge 28 which is curved.

The present invention provides a grinder 30 having a cylindrical type grinding wheel 31 which, when applied to the cutting edge of the tooth, will sharpen all three portions thereof. This requires that the grinder be maintained at a particular elevation and that it also be maintained at a certain angle with respect to the plane of the blade, as will be pointed out hereinafter.

The gauge teeth 22 are so called because they serve as depth gauges to limit the bite taken by the cutter teeth. Therefore, the height of the gauge teeth must bear a predetermined relationship with respect to the height of the highest portion of the cutter teeth; this difference in height being preferably between .020 and .030 inch. Due to their tapering configuration, it is evident that as the cutter teeth are ground away in the course of successive sharpenings, their height will diminish; consequently the height of the gauge teeth must be correspondingly diminished.

A preferred form of my invention, as shown in Figs. 6 to 11, inclusive, comprises a mounting plate 32, a vertical slide 33 having a support portion 34, a slide bracket 35, and a horizontal slide 36 mounted on said support member, the grinder 30 being mounted on the horizontal slide.

The mounting plate 32 is suitably secured to the saw blade 18, as shown in Figs. 6 and 7, by bolts 37 and wing nuts 38. The mounting plate includes side guides 39 which guide the vertical slide 33 in its up and down movement. The vertical slide 33 includes a vertically disposed plate member 40 which is received between the side guides and which is confined in position by means of a bolt 41, a washer 42 and a wing nut 43, the bolt extending through a suitable slot 44 in the plate member 40 to permit vertical sliding movement. By tightening up on the nut 43, the parts may be clamped in any given position since the bolt is provided with a counter-sunk square or hexagonally shaped head 45.

The mounting plate 32 is also provided with a horizontally disposed flange 46 through which extends a regulating screw 47, the latter being threaded into a suitable threaded opening in the support or other portion 34 of the vertical slide 33. Thus, by rotating the regulating screw 47, prior to the time that the nut 43 is tightened up, the elevation of the vertical slide and its associated parts may be adjusted with a fine degree of accuracy.

The slide bracket 35 is pivotally mounted on the support portion 34 by means of a suitable screw 48 which can be tightened up in order to lock the parts in any desired angular position. It will be observed that the forward edge of the support member is provided with suitable index marks 49 so as to assist the operator in obtaining that angular position which is recommended for the particular type of cutter tooth; for instance, with certain types of cutter teeth a 30° angle between the grinder axis and the perpendicular to the plane of the tooth body is recommended in order to secure the proper tooth rake along the vertically disposed cutting edge 26.

The slide bracket 35 is provided with a recessed portion 51, providing horizontally disposed shoulders 52 on which the horizontal slide 36 rests. The support member also provides vertically disposed guide walls 53 which serve to confine the movement of the slide 36 to a longitudinal movement.

As shown in Figs. 6 and 8, a longitudinally disposed slot 54 is provided in the recessed portion 51 of the slide bracket 35, the slot having an enlarged portion 55 near one end. A headed stud 56 extends through the slot 55 so as to secure the slide 36 to the slide bracket, the stud being secured to the slide 36. The enlarged portion 55 permits separation of the slide and of the slide bracket.

As shown in Fig. 9, the horizontal slide 36 includes a depending portion 57 which fits into the recessed portion 51.

The rear portion of the slide is provided with a V-shaped recess 58 which supports the cylindrical housing of the grinder 30 in centered relationship. The front portion of the horizontal slide is provided with a second V-shaped recess 59 which is disposed at a somewhat higher elevation than the first one. The front end of the grinder 30 is supported in this latter recess 59.

The particular grinder shown herein is a hand grinder of standard design. To accommodate a grinder of different shape or proportions a different horizontal slide may be substituted for the slide shown.

The grinder is preferably secured to the horizontal slide by means of springs 60 and 61 which encircle the rear portion and the front portion of the grinder, the ends of the springs being hooked over suitable screws 62.

Figure 1:
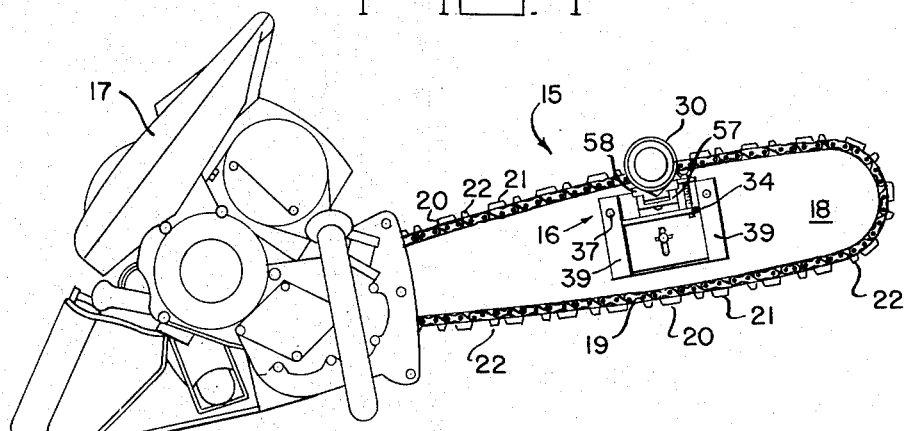
Fig. 1 shows a preferred embodiment of my invention as applied to a chain saw.

In operation, the mounting plate 32 is secured to the saw blade 18 by means of bolts and wing nuts 37, 38 in the manner shown in Figs. 1 and 6. The parts are then set in the desired position: first, by adjusting the elevation of the grinder axis, and secondly, by adjusting its angular orientation. The clamping action of the bolt and wing nut 43 maintains a vertical slide and its associated parts at the desired axial elevation; the regulating screw 47 provides a feed by means of which the desired elevation can be accurately determined prior to tightening up the wing nut 43.

Then, by loosening the clamping screw 48, the slide bracket may be swung to the desired angular orientation, such as 30°, the slide bracket being moved to the left for grinding the right-hand series of cutter teeth, and to the right for grinding the left-hand series. The clamping screw 48 is then tightened up. As shown in the drawings, the regulating screw 47 and the clamping screw 48 are desirably provided with wing heads, and wing nuts for the various other screw and bolts are also provided for the convenience of the operator.

Then, after the parts are set, as shown in Figs. 6 and 7, a given tooth is marked, to indicate the starting point; the grinder and its slide 36 is slid forwardly until the wheel 31 extends between the marked tooth and the preceding gauge tooth. The clutch of the driving means 17 is set in release position so that the chain may be shifted with respect to the blade. Then the chain is pulled forwardly so that the leading or cutting edge of the cutter tooth is brought into engagement with the rotating wheel 31 of the grinder. Thus, the cylindrical surface is ground, thereby providing a new cutting edge. The grinder is then retracted, the cutter tooth of that series is brought into position, and the operation is repeated, until all of the teeth of the right-hand series have been ground. Then the clamping screw 48 is loosened, the slide bracket is swung over to its right hand position, and the series of operations is repeated for the left-hand series of cutter teeth.

As previously pointed out, the tapering configuration of the cutter teeth requires grinding of the gauge teeth at intervals. This is accomplished by readjusting the axial elevation to correspond with the desired gauge tooth height. In this operation, either the gauge tooth can be drawn under the wheel, or the chain may be held stationary while a sweeping motion is imparted to the slide bracket and the grinder. The latter method is usually desired. Therefore, the clamping screw 48 is left somewhat loose so as to permit a free sweeping movement of the slide bracket on its support 34, this sweeping movement being about the axis provided by the clamping screw.

A modified form of my invention, designed for use where a tilt is also desired, is shown in Figs. 12 to 15.

In the embodiment of Figs. 6 to 11, the cylindrical surface ground on the cutter tooth has a horizontal axis. That is, the axis will lie in a plane which is perpendicular to the plane of the saw blade and chain path. However, in some instances, it may be desired to incline this cylindrical axis, which is the same as the grinder axis, above or below this horizontal plane, thereby providing a somewhat different rake on the cutting edge, and also changing somewhat the shape of the cutting edge, particularly the horizontal portion 27. To obtain this result, I have provided a universal, or ball and socket, type of connection between the support and the slide bracket.

In the modified form of the invention, the parts which correspond to the parts heretofore described in connection with Figs. 6 to 11, are indicated by the same reference numerals. Thus, the sharpener includes a mounting plate 32, a vertical slide 33, a support 64, a slide bracket 65, and a horizontal slide 36 on which the grinder 30 is mounted. Except for the ball and socket joint between the support 64 and the slide bracket 65, the remaining parts are substantially the same, except for a flange 66 which is provided on the vertical slide 33 and which cooperates with the regulating screw 47 to provide means for adjusting the axial elevation of the grinder.

The support 64 includes a spherical member or ball 67 having a threaded bore 68. The support is secured to the mounting plate 32 by means of suitable screws 69.

Figure 12:
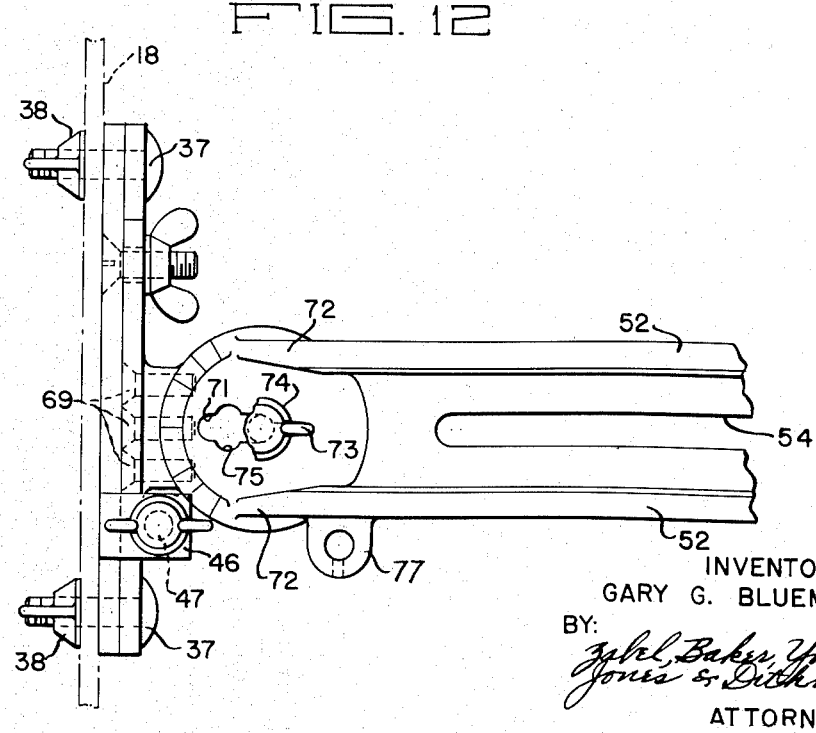
Fig. 12 is a plan view of a modified form of my invention.

The slide bracket 65 includes a hemispherical socket 70 formed with a slot 71. The slot, as shown in Fig. 12, is disposed between two ribs 72 which form continuations of the shoulders 52. A clamping screw 73, having a washer 74, extends through the slot 71 and into the bore 68. Thus, the slide bracket and the grinder may be tilted upwardly or downwardly to the extent permitted by the length of the slot 71. For example, as shown herein, the length of the slot will permit a tilt of up to 15° on either side of the horizontal. The slot is of a width that will fit closely with the upper portion of the screw 73 so that the screw will serve as a vertical axis to permit adjustment or angular orientation of the slide bracket and grinder in a horizontal plane, in the same manner as pointed out in connection with Figs. 6 to 11. If preferred, the upper portion of the screw can be provided with an unthreaded cylindrical surface to provide a somewhat closer fit than that which can be obtained by the screw threads.

It will be observed in Figs. 12 and 14 that the central part of the slot 71 is provided with an enlarged portion. Fig. 15 shows a special form of screw 73' which is provided with an enlarged shoulder portion 76 which is adapted to fit into the enlarged slot portion 75 in order that the slide bracket may be locked in a horizontal position. The shoulder 76 may be provided with a slight taper, if desired, so as to take up any tolerances or wear, thereby providing greater accuracy in the horizontal position.

Where it is desired to grind the gauge teeth by sweeping the grinder back and forth in a horizontal plane, as discussed in connection with Figs. 6 to 11, the special screw 73' may be used which will lock the slide bracket in the horizontal position without the necessity of screwing up the clamping screw so tightly as to prevent this horizontal sweeping motion. Thus, when the special screw 73' is used, the operation is substantially identical to that of the embodiment shown in Figs. 6 to 11; at other times, the operation is the same except that a tilting motion is also provided.

The slide bracket 65 may include a boss 77 for a diamond wheel dresser.

It will be understood that various modifications and changes may be made in the constructions shown and described herein without departing from the spirit of my invention as pointed out in the appended claims.

I claim:

1. A chain saw sharpener comprising a mounting plate adapted for mounting on the blade of a chain saw, and having vertically disposed guide means, a slide having a vertical plate portion and a support portion, said vertical plate portion engaging said mounting plate in surface abutting relationship and being confined by said side guides to vertical motion, means for securing said vertical plate portion in adjusted position to said mounting plate in surface abutting engagement, a bracket, said support portion including a ball member and said bracket including a socket member for cooperation therewith, said socket member being slotted in a longitudinal direction, clamping means operative to urge said socket member into frictional engagement with said ball member so that the bracket may be secured with respect to said support portion, said clamping means including a screw member extending through said slot and serving as a pivot for angular adjustment of said bracket about a substantially vertical axis, a second slide mounted on said bracket for movement toward and away from said mounting plate, and means for securing a grinder to said grinder bracket with the wheel thereof extending toward said mounting plate whereby the wheel of a grinder mounted on said second slide may be moved longitudinally of said bracket into and out of operative engagement with the teeth of said chain saw.

2. A chain saw sharpener as claimed in claim 1 in which said bracket is adjustable for tilting movement about a substantially horizontal axis.

3. A chain saw sharpener as claimed in claim 1 in which said slot is provided with an enlarged portion, and in which said screw member is provided with a shoulder fitting into said enlarged portion so that said bracket may be maintained against tilting movement when said clamping means are inoperative, thereby permitting a sweeping motion of said grinder about said vertical axis.

4. A chain saw sharpener comprising a mounting plate having vertically disposed side guides, means for securing said mounting plate to the blade of a chain saw, a slide having a vertical plate portion and a support portion, said vertical plate portion engaging said mounting plate in surface abutting relationship and being confined by said side guides to vertical motion, means for confining said slide against said mounting plate in surface abutting engagement, a bracket, first screw threaded means pivotally mounting said bracket on said support portion for angular adjustment about a vertical axis, a second slide mounted on said bracket for movement toward and away from said mounting plate, means for securing a grinder to said second slide with the wheel thereof extending toward said mounting plate, and second screw threaded means connecting said mounting plate and said first-mentioned slide for regulating the relative vertical positions thereof whereby a grinder mounted on said second slide may be moved into position both for sharpening the cutter teeth of said chain saw and for grinding the gauge teeth associated with said cutter teeth, said first screw threaded means when tightened up, serving to clamp said bracket in a given angular position for sharpening cutter teeth, and when loosened, serving as a pivot to permit a sweeping motion of said grinder about said vertical axis for grinding said gauge teeth.

5. A chain saw sharpener including a bracket, means engaging one end of said bracket for adjustably mounting said bracket in a cantilevered manner on the blade of a chain saw, said means permitting pivotal movement of said bracket with respect to said saw blade about a vertical axis, said bracket having longitudinally disposed guide means, a slide mounted on said bracket and having portions engaging said guide means to permit free longitudinally sliding motion thereof, said slide having a substantially centered V-shaped supporting portion, a grinder having a substantially cylindrical housing portion engaged and supported by said V-shaped supporting portion, and means connected to said supporting portion and embracing said cylindrical housing portion to maintain said grinder in contact with said V-shaped supporting portion, whereby said grinder will be maintained in fixed relationship with respect to said slide and with its axis in substantial parallelism with the direction of said longitudinally sliding motion.

6. A chain saw sharpener as claimed in claim 5 in which said last-named means comprises a length of flexible helical wire spring secured at both ends to said supporting portion.

7. A chain saw sharpener as claimed in claim 5 in which said grinder has a forwardly projecting portion of smaller diameter than said cylindrical housing portion, and in which said slide is provided with a second V-shaped supporting portion engaging and supporting said forwardly projecting portion.

References Cited in the file of this patent

UNITED STATES PATENTS

| | | |
|---|---|---|
| 1,771,602 | Armstrong et al. | July 29, 1930 |
| 2,178,264 | Meyer | Oct. 31, 1939 |
| 2,344,478 | Yow | Mar. 14, 1944 |
| 2,422,871 | Wilson | June 24, 1947 |
| 2,430,984 | Hopkins | Nov. 18, 1947 |
| 2,439,279 | Andrus | Apr. 6, 1948 |
| 2,568,062 | Fitch | Sept. 18, 1951 |